UNITED STATES PATENT OFFICE.

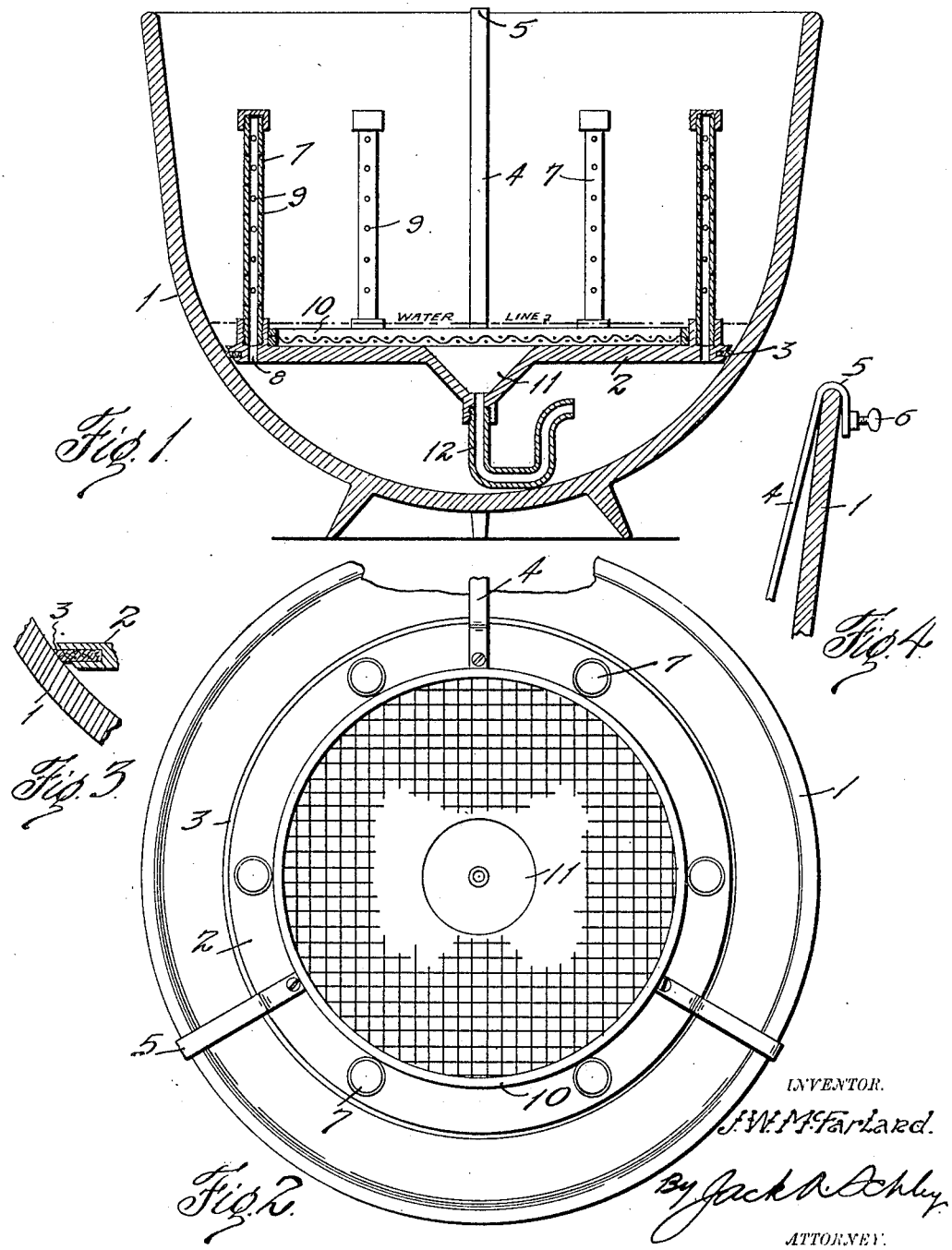

JAMES W. McFARLAND, OF BROWNWOOD, TEXAS.

WASHING APPLIANCE.

1,292,833. Specification of Letters Patent. Patented Jan. 28, 1919.

Application filed October 22, 1917. Serial No. 197,957.

*To all whom it may concern:*

Be it known that I, JAMES W. MCFARLAND, a citizen of the United States, residing at Brownwood, in the county of Brown and State of Texas, have invented certain new and useful Improvements in Washing Appliances, of which the following is a specification.

This invention pertains to new and useful improvements in washing appliances.

The primary feature of the invention is the provision of means whereby an ordinary wash pot or boiler may be converted into an efficient automatic washing apparatus.

In carrying out the invention an attachment is provided and arranged to be positioned in an ordinary wash pot or kettle, whereby clothes placed in the pot are subjected to the action of jets of hot water and steam as well as a downward precipitation of water through the clothes which causes a quick and thorough removal of the dirt.

In the present embodiment a plate or false bottom having a peripheral packing or gasket is made of such diameter as to rest on the pot above the bottom thereof and form a steam-tight joint with the wall of the pot. Supports for positioning the plate are provided. Vertical jet columns are mounted on the upper side of the plate and a trap device depends from the center of the plate into the water reservoir formed thereunder. When the water is boiled it will rise in the columns and be ejected in jets through the perforations thereof. The boiling water and steam will close the trap device until an accumulation of water is had above the plate and when this water overcomes the pressure below, the trap will suddenly release said water.

The invention will be more readily understood from a perusal of the following specification and by reference to the accompanying drawings, in which an example of the invention is shown, and wherein:

Figure 1 is a vertical sectional view of a wash pot equipped with an attachment constructed in accordance with the invention, Fig. 2 is a plan view of the same, Fig. 3 is a sectional detail of the steam-tight joint, and Fig. 4 is a detail of the fastening means.

In the drawings the numeral 1 designates an ordinary iron kettle or wash pot. Within this pot a horizontal plate or false bottom 2 is disposed. This plate may be made in any suitable way, as for instance of cast iron. An annular peripheral packing ring or gasket 3 is let into the periphery of the plate, said ring being of asbestos or other material which will not burn. The diameter of the plate is such that when placed in the pot the ring 3 will contact with the wall of the pot some distance above the bottom, whereby a space or water reservoir will be provided under the plate. I prefer to provide hangers 4 secured to the upper side of the plate and having hooks 5 at their upper ends engaging over the edge of the pot as is shown in detail in Fig. 4. These hangers cause the plate to be placed in the pot in a substantially true horizontal plane so that the packing contacts at all points with the wall of the pot. A set screw 6 may be provided in the hook 5 for fastening the same to the pot. If the plate is made of cast iron its weight will be sufficient to hold it down against the pressure of the steam which may be generated under the plate.

Near the edge of the plate a plurality of vertical columns or pipes 7 are provided and communicate with openings 8 in the plate. These columns have their upper ends closed and are provided with perforations 9. Hot water and steam rising in these columns will be ejected through the perforations in fine jets which will spray upon the clothes. The clothes are supported on foraminous support 10 disposed on the plate within the columns. At the center the plate has a conical depression or well 11 depending into the reservoir thereunder. An angular pipe 12 or trap device extends down from the well in juxtaposition to the bottom of the pot, then upward near the plate where it has its outlet.

In using the apparatus the clothes are placed on the pot on the support 10 and the pot is filled with water to a point where the plate is covered. Heat being supplied under the pot, the water is boiled. The water in the reservoir seals the trap 12 and as said water boils it rises in the columns 7, the steam and hot water escaping through the perforations 9 in jets which fall upon the clothes. The steam condenses and the water accumulates above the plate until the seal of the trap is broken, at which time the water will be suddenly precipitated down through the trap into the reservoir. This action will recur at frequent intervals.

What I claim is:

In a removable washing attachment for wash pots, a clothes support having provision for forming a steam-tight joint with the wall of a wash pot, and a trap depending from the clothes support, the clothes support also having means for admitting jets of hot water and steam above the support.

In testimony whereof I affix my signature.

JAMES W. McFARLAND.

Copies of this patent may be obtained for five cents each, by addressing the "Commissioner of Patents, Washington, D. C."